United States Patent [19]

Tsukagoshi

[11] Patent Number: 4,852,626

[45] Date of Patent: Aug. 1, 1989

[54] BEAD REINFORCEMENT FOR PNEUMATIC RADIAL TIRE FOR HEAVY-DUTY ROAD VEHICLE

[75] Inventor: Tetsuhito Tsukagoshi, Tokyo, Japan

[73] Assignee: Bridgestone Corporation, Tokyo, Japan

[21] Appl. No.: 100,060

[22] Filed: Sep. 23, 1987

[30] Foreign Application Priority Data

Sep. 30, 1986 [JP] Japan .................................. 61-230118

[51] Int. Cl.$^4$ ............................................ B60C 15/06
[52] U.S. Cl. ..................... 152/541; 152/543; 152/546
[58] Field of Search ............... 152/539, 541, 542, 543, 152/546, 547, 548, 552, 554, 555

[56] References Cited

U.S. PATENT DOCUMENTS

| | | | |
|---|---|---|---|
| 3,964,533 | 6/1976 | Arimura et al. | 152/543 X |
| 4,319,621 | 3/1982 | Motomura et al. | 152/546 X |
| 4,700,764 | 10/1987 | Endo et al. | 152/546 X |

FOREIGN PATENT DOCUMENTS

| | | | |
|---|---|---|---|
| 78304/75 | 8/1976 | Australia . | |
| 993770 | 7/1976 | Canada . | |
| 2340310 | 2/1975 | Fed. Rep. of Germany . | |
| 2508597 | 9/1975 | Fed. Rep. of Germany . | |
| 59-190011 | 10/1984 | Japan . | |
| 47705 | 3/1985 | Japan | 152/539 |
| 64504 | 4/1986 | Japan | 152/542 |
| 584501 | 4/1969 | Luxembourg . | |
| 970772 | 9/1964 | United Kingdom | 152/542 |
| 1139086 | 1/1969 | United Kingdom | 152/542 |

WO8706199 10/1987 World Int. Prop. O. .

OTHER PUBLICATIONS

Patent Abstracts of Japan, vol. 9, No. 55 (M-362)[1778], Mar. 9, 1985; & JP-A-59 190 011 (Sumitomo Gomu Kogyo K.K.) 10-27-1984.

Patent Abstracts of Japan, vol. 10, No. 163 (M-487)[2219], Jun. 11, 1986; & JP-A-61 16 106 (Sumitomo Gomu Kogyo K.K.) 1-24-1986.

*Primary Examiner*—Michael W. Ball
*Assistant Examiner*—Geoffrey L. Knable
*Attorney, Agent, or Firm*—Sughrue, Mion, Zinn, Macpeak & Seas

[57] ABSTRACT

To prevent bead displacement under heavy load or to improve bead durability without increasing tire weight and decreasing tire productivity, the carcass is sandwiched between two reinforcing layers near the bead in such a way that metallic cords of the carcass and the two reinforcing layers, extending in three different directions, provide a triangular reinforcement structure. The radial distance $H_1$ of the first reinforcing layer from the rim is 0.3 to 0.7 H (where H denotes a radial distance between the rim and the maximum tire width position); the radial distance $H_2$ of the first reinforcing layer is 0.25 to 0.6 H; the radial distance $H_3$ between $H_1$ and $H_2$ is 0.05 H or more; and the radial overlap distance $\alpha$ between two reinforcing layers is 0.1 H or more. Further, the overlap length l between the two layers is 0.25 L or more (where L denotes the width of the first reinforcing layer).

7 Claims, 3 Drawing Sheets

FIG.1(B) (Comparative)

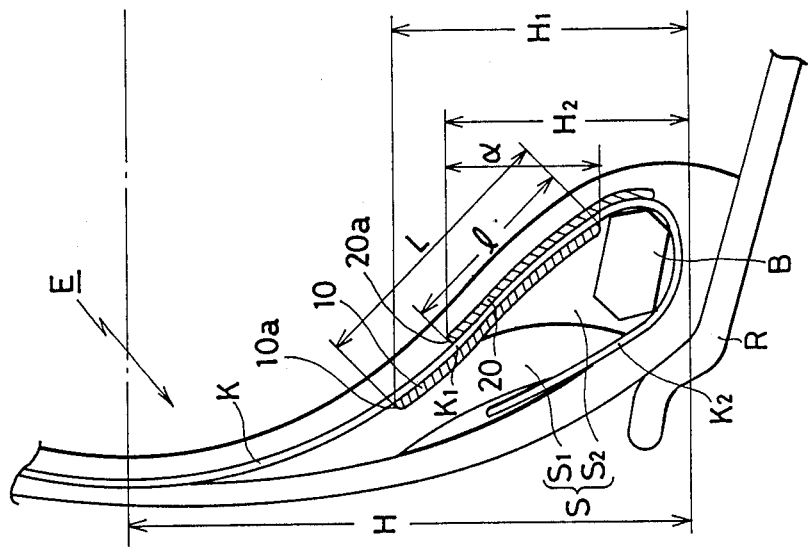
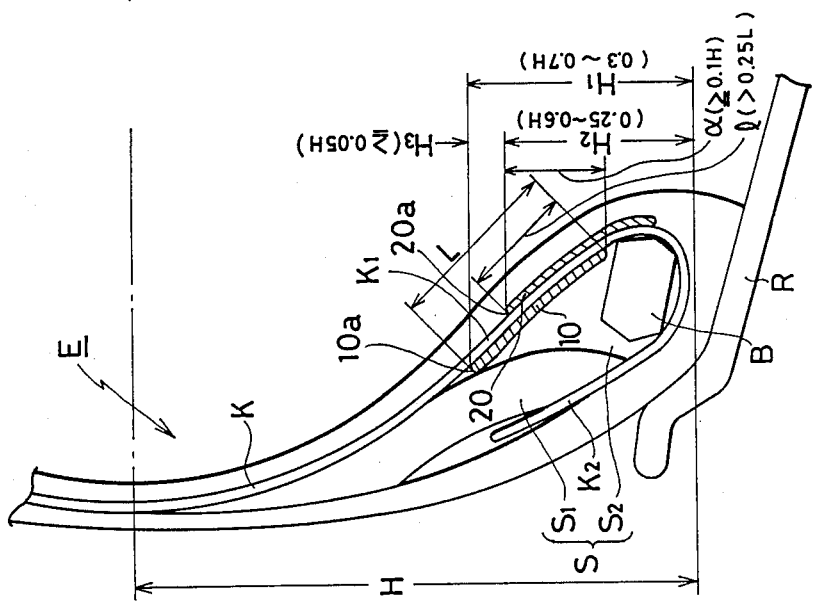

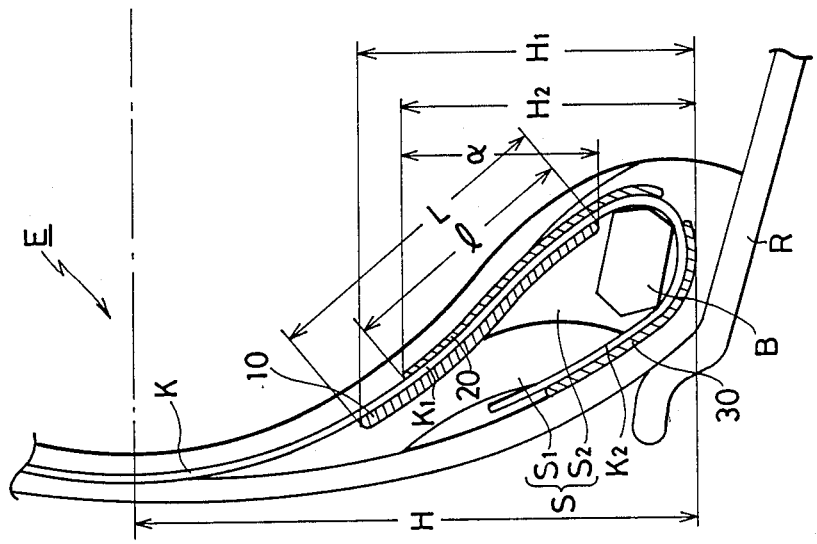
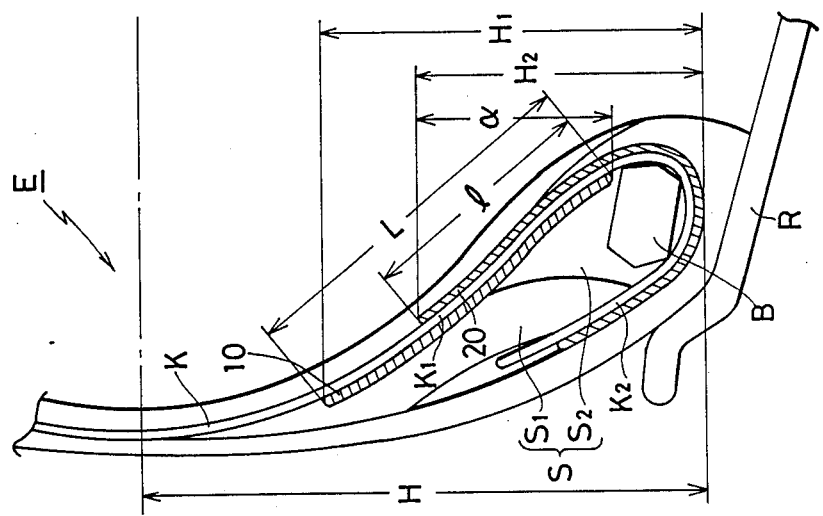

BEAD REINFORCEMENT FOR PNEUMATIC RADIAL TIRE FOR HEAVY-DUTY ROAD VEHICLE

BACKGROUND OF THE INVENTION

1. Field of the Invention

The present invention relates to a pneumatic radial tire for a heavy-duty road vehicle, and more specifically to a pneumatic radial tire for a heavy-duty road vehicle which can markedly improve durability and recapped-tire durability of the bead by suppressing bead movement during vehicle traveling.

2. Description of the Prior Art

In prior-art pneumatic radial tires for heavy-duty road vehicles such as trucks, buses, etc. as shown in FIG. 1A, a bead core B is wrapped up by a carcass K composed of metallic cords arranged at roughly 90 degrees with respect to the tire circumferential direction in such a way as to extend from the tire inner side to the tire outer side radially outwardly to a radial distance P; a chafer C of textile (i.e. nylon) or wire is arranged extending from a radial distance a along the bead wrapping area; and a rubber stock S is sandwiched between the inner portion and the outer (turn-up) portion of the carcass to firmly reinforce a bead of a tire. Here, the chafer is a strip of rubberized fabric (nylon or wire) covering the bead of a tire as a protection from chafing against the rim R.

On the other hand, a strong belt layer is arranged between the carcass and a tread rubber to sufficiently increase the tire performance. The tread and the bead are connected to each other by a soft side portion of the tire mainly composed of the carcass ply and a thin sidewall rubber. Therefore, there exists a discontinuous area in rigidity between the rigid bead and the soft sidewall rubber.

As a result, when the tire sidewall is greatly deformed and the bead is greatly displaced repeatedly during tire rotation under heavy load, the rubber is peeled off near a carcass turn-up end located in the discontinuous area, thus resulting in separation faults and therefore low bead durability.

To improve the bead durability, various proposals have been made with respect to how to arrange the bead reinforcing layer such as nylon chafer, wire chafer, etc. In more detail, in the conventional way of arranging the bead reinforcing layer, since the strength of nylon chafer is relatively small, two or four nylon chafers are usually arranged. On the other hand, since the strength of wire chafer is relatively large, only a single wire chafer is usually arranged. Further, a few nylon chafers are further arranged in addition to a single wire chafer to further improve the bead reinforcement effect.

However, when the bead is reinforced by use of only nylon chafers to improve bead durability, there exists a limitation of the number of chafers because the weight is increased; the productivity is lowered; and heat is generated during traveling.

Further, when the bead is reinforced by a nylon chafer and a wire chafer in combination, there exists another problem with respect to the manufacturing equipment, in addition to an increase in weight and a decrease in productivity.

Further, when the bead is reinforced by a wire chafer, although it is possible to obtain a bead reinforcement effect to some extent without increasing the weight and decreasing the productivity, the bead is greatly moved or displaced when the tire is filled with air and a heavy load is applied to the tire, therefore, bead durability is not satisfied.

To reduce the above-mentioned bead displacement in the tire reinforced by a wire chafer, a radial distance $H_a$ between the radially inward bead base line $\overline{0}$ and the radially outward end a of the chafer C has conventionally been increased, as shown in FIG. 1(A), to improve the durability. In this manner of improvement, if the above radial distance $H_a$ is excessively increased, there arises another problem in that cracks will be produced in the outward end a of the wire chafer C and spreads to the tire inner liner, thus resulting in trouble.

SUMMARY OF THE INVENTION

With these problems in mind, therefore, it is the primary object of the present invention to provide a pneumatic radial tire for a heavy-duty road vehicle which can improve durability and recapped-tire durability of the bead by suppressing radial bead displacement during vehicle traveling, without increasing tire weight and decreasing tire productivity, in dependence upon an improvement in bead structure.

To achieve the above-mentioned object, a pneumatic radial tire for a heavy-duty road vehicle having bead cores, rubber stocks and a carcass composed of radially arranged metallic cords and an inner carcass portion extending between one of the bead core and another bead core and a turn-up portion and extending radially inwardly from the tire inner side to the tire outer side around the bead core so as to wrap up the bead core and the rubber stocks, which comprises: (a) first reinforcing layers each composed of metallic cords intersecting the carcass cords at an angle and arranged between the rubber stock and the inner carcass portion, a radially inward end thereof being located near an inner outward end of the bead core and a radially outward end thereof being located within a range of 0.3 to 0.7H where H denotes a radial distance between a bead base line and a maximum tire width position; and (b) second reinforcing layers each composed of metallic cords intersecting the metallic cords of said first reinforcing layer and the carcass at two different angles and arranged so as to sandwich the inner carcass portion in cooperation with said first reinforcing layer in overlapping relationship to said first reinforcing layer in such a way that said first and second reinforcing layers are overlapped with each other extending within a range corresponding to at least 25% of a peripheral length L of said first reinforcing layer beginning from an outer end of said second reinforcing layer located at least 0.05H inward from an outer end of said first reinforcing layer.

In the pneumatic radial tire according to the present invention, since the metallic cords of the first and second reinforcing layers intersect each other, and further these metallic cords intersect the metallic cords of the carcass at two different angles with the carcass sandwiched between the two reinforcing layers, a great number of triangular areas can be formed by the metallic cords extending in three different directions. Therefore, it is possible to effectively reduce bead displacement in dependence upon the high rigidity of metallic cords and the triangular reinforcement structure, thus preventing separation faults at the turn-up end of the carcass.

An overlap length l between the first and second reinforcing layers is 0.25 L or more where L denotes a length of the first reinforcing layer in a cross section of the tire. The radially outward end of the second reinforcing layer is located 0.05H or more, more preferably 0.1 to 0.5H away inward from the radially outward end of the first reinforcing layer.

The intersection angles between cords of the first and second reinforcing layers and cords of the carcass lie within an angular range of ±40 to ±70 degrees so as to form triangular reinforcement structure by the cords extending in three different directions.

The radially inward end of the second reinforcing layer is located near the innermost end of the bead core or extends radially inwardly from the tire inner side to the tire outer side radially outwardly so as to wrap up the bead core perfectly and a radially inward end of the rubber stock partially. Further, it is also possible to further arrange a third reinforcing layer along the carcass which wraps up the bead radially outward.

BRIEF DESCRIPTION OF THE DRAWINGS

The features and advantages of the pneumatic radial tire for a heavy-duty road vehicle according to the present invention over the prior-art pneumatic tire will be more clearly appreciated from the following description of the preferred embodiments of the invention taken in conjunction with the accompanying drawings in which like reference symbols designate the same or similar elements or sections throughout the figures thereof end in which:

FIG. 1(B) is a similar cross-sectional view showing the same portion of a comparative pneumatic radial tire to pneumatic radial tires according to the present invention;

FIG. 2(A) is a similar cross-sectional view showing the basic structure iof the essential portion of a pneumatic radial tire according to the present invention;

FIG. 2(B) is a similar cross-sectional view showing the essential portion of a first embodiment of the pneumatic radial tire according to the present invention;

FIG. 3 is a similar cross-sectional view showing the essential portion of a second embodiment of the pneumatic radial tire according to the present invention; and FIG. 4 is a similar cross-sectional view showing the essential portion of a third embodiment of the pneumatic radial tire according to the present invention.

DETAILED DESCRIPTION OF THE PREFERRED EMBODIMENTS

Figure 1A:
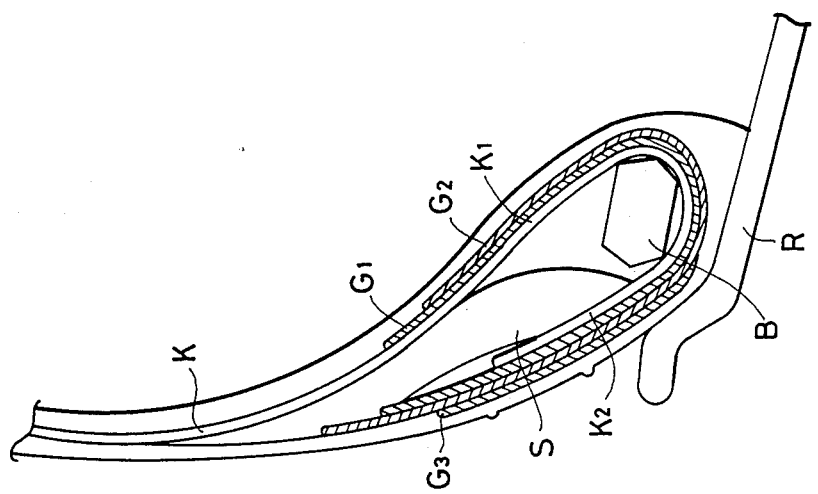
FIG. 1(A) is an enlarged cross-sectional view showing the essential portion of the prior-art pneumatic radial tire.
Figure 1A:
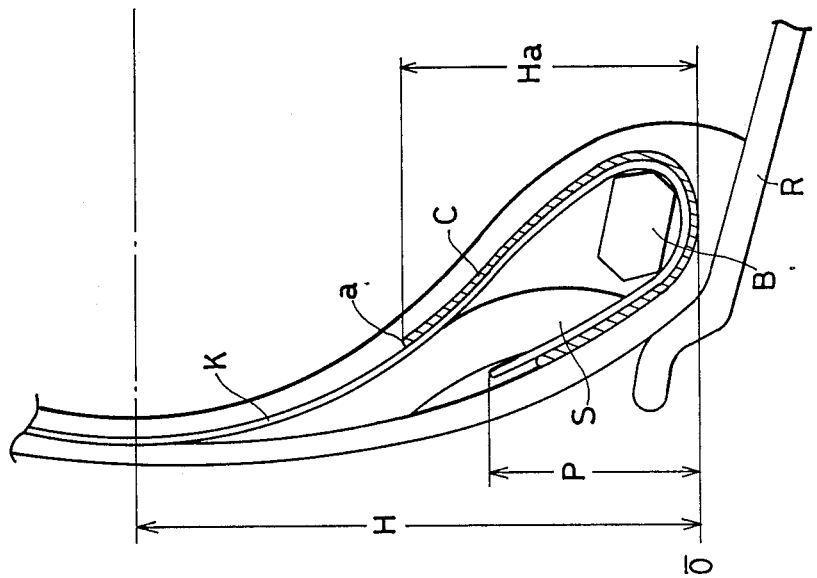

FIG. 2(A) shows the basic structure of a pneumatic radial tire E of the present invention. The tire E comprises a carcass K, a rubber stock S including a first stock $S_1$ and a second stock $S_2$, and a bead core B. The carcass K is composed of metallic cords arranged at roughly 90 degrees with respect to the tire circumferential direction, and wraps up the bead core B in such a way as to extend radially outwardly from the tire inner side to the tire outer side. Further, the rubber stock S is sandwiched between the inner carcass portion $K_1$ and the outer (turn-up) carcass portion $K_2$ with the bead core B surrounded therebetween at the radially inward end of the tire E.

The feature of the present invention is to provide a first reinforcing layer 10 composed of metallic cords and arranged between the rubber stock S and the inner carcass portion $K_1$ and a second reinforcing layer 20 also composed of metallic cords and arranged between the inner carcass portion $K_1$ and an inner liner in such a way that cords of the first reinforcing layer 10 intersect cords of the second reinforcing layer 20 at an angle in overlapping relationship to each other. Therefore, the metallic cords off the first reinforcing layer 10 intersect those of the carcass at a first angle, and those of the second reinforcing layer 20 intersect those of the carcass at a second angle.

The radially inward end of the first reinforcing layer 10 is located near the outward end of the bead core B, and the radially outward end 10a of the first reinforcing layer 10 is located within a range in height from a rim $H_1 = 0.3$ to $0.7H$ where H denotes a radial distance from a rim R to a tire maximum width position. The outward end 20a of the second reinforcing layer 20 is located at least 0.05H radially inward away from the radially outward end 10a of the first layer 10, and preferably within a range in height from a rim $H_2 = 0.25$ to $0.6H$. The radial overlap distance $\alpha$ between the two reinforcing layers 10 and 20 is at least 0.1H or the overlap length l between the two layers 10 and 20 is 0.25 L or more, where L denotes the length of the first reinforcing layer 10. Therefore, the inner carcass portion $K_1$ is sandwiched between the two layers 10 and 20 at least the overlapped area.

In more detail, the radial distance $H_1$ of the first reinforcing layer 10 arranged between the rubber stock S and the inner carcass portion $K_1$ is preferably 0.05H or more higher than that $H_2$ of the second reinforcing layer 20.

That is, the relationship of $H_1 \geq H_2 + (0.05H)$ and more preferably $H_1 \geq H_2 + (0.1H$ to $0.5H)$ should be satisfied.

This is because when the radial distance $H_1$ of the first reinforcing layer 10 is the same as that $H_2$ of the second reinforcing layer 20, there exists a problem such that end separation may be produced by shearing distortion. On the other hand, when $H_1$ is much higher than $H_2$, distortion is concentrated at the outward end 10a of the first reinforcing layer 10 and the rigidity increasing effect obtained by intersecting the reinforcing cords of the two layers 10 and 20 each other can be reduced.

Further, it is preferable that the radial distance $H_1$ of the first reinforcing layer 10 is $$0.7H \geq H_1 \geq 0.3H$$

This is because if $H_1$ is 0.3H or less, bead displacement increases; if 0.7H or more, distortion is concentrated at the outward end 10a of the first reinforcing layer 10.

Further, the reason why the inward end of the first reinforcing layer 10 is terminated near the inner end of the bead core B is as follows: since the first reinforcing layer 10 is located between the rubber stock S and the inner carcass portion $K_1$, when the lower end of the first reinforcing layer 10 is extended to the inner side surface of the bead core B, there exists a problem such that the tightness of the carcass K around the bead core B decreased when the carcass K wraps up the bead core B, thus resulting in lower durability.

Further, it is preferable that the radial distance $H_2$ of the second reinforcing layer 20 arranged inside the inner carcass portion $K_1$ is, $$0.6H \geq H_2 \geq 0.25H$$

This is because if $H_2$ is 0.25H or less, the bead displacement increases; if 0.6H or more, distortion increases at the outward end 20a of the second reinforcing layer.

Further, it is preferable to determine the radial overlap distance $\alpha$ of the first and second reinforcing layers 10 and 20 within a range of $\alpha \geq 0.10H$.

Further, it is preferable to determine the overlap length l of the first and second reinforcing layers 10 and 20 within a range of $l \geq L/4$ where L denotes the length of the first reinforcing layer 10.

Further, it is preferable to determine the intersection angle between the metallic cords of the first and second reinforcing layers 10 and 20 and the carcass layer cords within a range of $\pm 40$ to $\pm 70$ degrees.

That is, if the first reinforcing layer 10 is inclined rightward (leftward) with respect to cords of the carcass K within a range of 40 to 70 degrees, the second reinforcing layer 20 is inclined leftward (rightward) with respect to cords of the carcass K within a range of 40 to 70 degrees.

This is because if the intersection angle of the reinforcing layer is 40 degrees or less, suppression effect against separation faults is degraded and therefore bead displacement increases. In other words, it is possible to prevent a space between two adjoining carcass cords from being widened while the tire is being rotated, because the carcass is sandwiched by the first and second reinforcing plies. As a result, it is possible to prevent bead displacement. Further, if the angle is 70 degrees or more, shearing distortion increases and there exists a danger such that separation faults may occur at the end 10a of the reinforcing layer.

It is more preferable to determine the intersection angle between the reinforcing cords and the carcass cords within a range of $\pm 50$ to 60 degrees from the standpoint of an improvement in bead durability.

In summary, the first reinforcing layer 10 serves to suppress bead displacement because the bead rigidity can be increased and to protect the outward end 20a of the second reinforcing layer 20 arranged inside the carcass K. Further, since the reinforcing cords of the first and second reinforcing layers 10 and 20 are arranged in two opposite directions, respectively while sandwiching the cords of the carcass K, these three cords provide a triangular reinforcement structure, thus reducing the bead displacement and therefore improving the bead durability.

Further, the rubber stock S surrounded by the inner carcass portion $K_1$, the outer carcass portion $K_2$, and the bead core B is divided into the rubber stock $S_1$ on the tread side and the rubber stock $S_2$ on the bead core B as shown, and the Shore hardnesses A of the rubber stocks $S_1$ and $S_2$ are determined so as to satisfy the relationship as $S_1 < S_2$.

That is, in the present embodiments, Shore hardness A of the rubber stock $S_1$ is determined as 61°, and that of the rubber stock $S_2$ is determined as 85°.

FIG. 2(B) shows a first embodiment of the tire according to the present invention, which is based upon the basic structure shown in FIG. 2(A). In this first embodiment, the outward end 10a of the first reinforcing layer 10 extends over the first rubber stock $S_1$.

FIG. 3 shows a second embodiment of the tire according to the present invention, which is also based upon the basic structure shown in FIG. 2(A). In this second embodiment, the outer side of the second reinforcing layer 20 wraps up the bead core B in such a way as to extend radially inwardly from the tire inner side to the tire outer side radially outwardly.

FIG. 4 shows a third embodiment of the tire according to the present invention. In this third embodiment, part of the second reinforcing layer 20 shown in FIG. 3 is separated near the innermost end of the bead core B; that is, it is also possible to consider that a third reinforcing layer 30 composed of metallic cords is additionally arranged along the outside of the outer turn-up portion $K_2$ of the carcass K.

EXAMPLES

To verify the effect of the tire of the present invention, the following durability tests have been made:
(Specifications of test tires)
Invention tires 1
The structure was as shown in FIG. 2(B).

$H_1 = 0.53\ H$
$H_2 = 0.43\ H$
$\alpha = 0.28\ H$
$l = 0.70\ L$

Cord angle of 1st reinforcing layer is 65° rightward
Cord angle of 2nd reinforcing layer is 60° leftward
Invention tires 2
The structure was as shown in FIG. 3.

$H_1 = 0.67\ H$
$H_2 = 0.50\ H$
$\alpha = 0.25\ H$
$l = 0.65\ L$

Cord angle of 1st reinforcing layer is 60° rightward
Cord angle of 2nd reinforcing layer is 60° leftward
Invention tires 3
The structure was as shown in FIG. 4.

$H_1 = 0.60\ H$
$H_2 = 0.52\ H$
$\alpha = 0.36\ H$
$l = 0.80\ L$

Cord angle of 1st reinforcing layer is 50° rightward
Cord angle of 2nd reinforcing layer is 60° leftward
Cord angle of 3rd reinforcing layer is 50° leftward
Comparative tires
The structure was as shown in FIG. 1(B). The bead core B is simply and perfectly wrapped up by two first and second reinforcing layers $G_1$ and $G_2$ made of metallic cords and part of the rubber stock S is also simply wrapped up by the same two layers $G_1$ and $G_2$. Further, a third reinforcing layer $G_3$ made of metallic cords is arranged on the second reinforcing layer $G_2$ and along the wrap-up portion $K_2$ of the carcass K.

(Test conditions and the method)
*Bead durability drum test
*Inner pressure . . . 120% of the normal inner pressure
*Load . . . 180% of the normal load, constant
*The test results are shown by indices with those of the comparative tire determined as 100. Therefore, the larger the indices is, the better will be the test results.

The test results are listed in Table 1 below.

TABLE 1

|  | Bead durability |
| --- | --- |
| Comparative tires | 100 |
| Invention tires 1 | 138 |
| Invention tires 2 | 165 |
| Invention tires 3 | 145 |

The above test results indicate that the invention tires can improve the bead durability by 20 to 40% as compared with the comparative tires.

Since the tires of the present invention are constructed as described above, it is possible to reduce the bead displacement during vehicle traveling and markedly improve the bead durability and recapped-tire bead durability, without increasing the tire weight and decreasing the productivity.

What is claimed is:

1. A pneumatic radial tire for a heavy-duty road vehicle, said tire comprising; a pair of bead cores, a rubber stock positioned above each bead core and a carcass composed of radially arranged metallic cords and an inner carcass portion extending between one of the bead core and another bead core and said carcass having turn-up portions each extending radially inwardly from the tire inner side to the tire outer side around each bead core so as to wrap up each bead core and the rubber stock;

a first reinforcing layer composed of metallic cords intersecting the carcass cords at an angle and arranged between each rubber stock and the inner carcass portion, a radially inward end thereof being located near an inner end of the bead core and not wrapping around said bead core and a radially outward end thereof being located within a range of 0.3 to 0.7H where H denotes a radial distance between a bead base line and a maximum tire width position; and a second reinforcing layer composed of metallic cords intersecting the metallic cords of said first reinforcing layer and the carcass at two different angles and arranged in cooperation with said first reinforcing layer so as to sandwich the inner carcass portion therebetween such that said first and second reinforcing layers are overlapped with each other extending within a range corresponding to at least 25% of a peripheral length L of said first reinforcing layer beginning from a radially outward end of said second reinforcing layer located at least 0.05H inward from a radially outward end of said first reinforcing layer and an inward end of said second reinforcing layer not wrapping around said bead core; where L is measured along said first reinforcing layer and H is the radial height from a rim to the tire maximum width position.

2. The pneumatic radial tire as set forth in claim 1, wherein a radially inward end of said second reinforcing layer is located near the axially innermost end of the bead core.

3. The pneumatic radial tire as set forth in claim 2, which further comprises a third reinforcing layer composed of metallic cords intersecting the metallic cords of the carcass and arranged along each carcass turn-up portion.

4. The pneumatic radial tire as set forth in claim 1, wherein the radially outward end of said second reinforcing layer is located 0.1 to 0.5H inward from the radially outward end of said first reinforcing layer.

5. The pneumatic radial tire as set forth in claim 1, wherein intersection angles between cords of said first and second reinforcing layers and cords of the carcass lie within an angular range of ±40 to 70 degrees so as to form triangular reinforcement structure by the cords extending in three different directions.

6. The pneumatic radial tire as set forth in claim 1, wherein each rubber stock is divided into a tread side rubber stock and bead core side rubber stock, the hardness of the tread side rubber stock being smaller than that of the bead core side rubber stock.

7. The pneumatic radial tire as set forth in claim 6, wherein the hardness of the tread side rubber stock is 61° in Shore A hardness and that of the bead side rubber stock is 85° in Shore A hardness.

* * * * *